Feb. 26, 1952 W. SIEGRIST 2,587,004
MULTISPEED GEAR SYSTEM.
Filed July 22, 1949
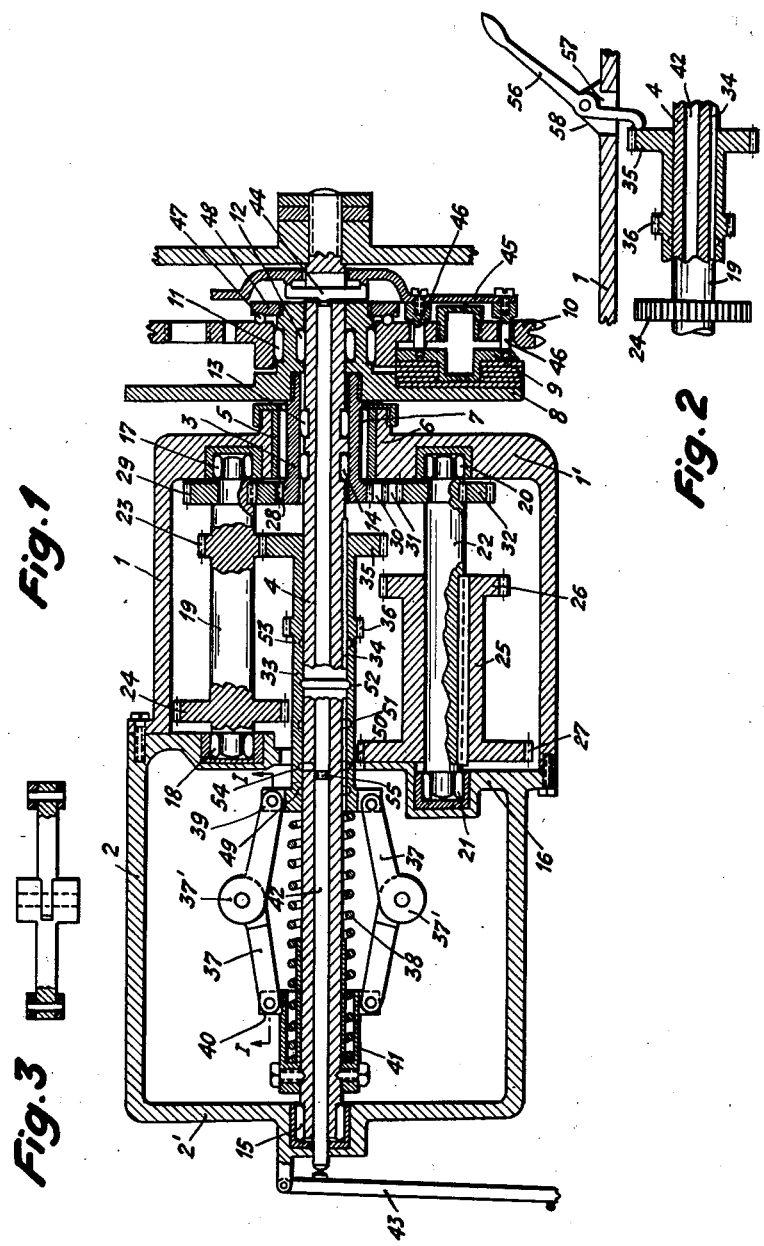

Patented Feb. 26, 1952

2,587,004

UNITED STATES PATENT OFFICE 2,587,004

MULTISPEED GEAR SYSTEM

Walter Siegrist, Saint-Imier, Switzerland

Application July 22, 1949, Serial No. 106,127
In Switzerland March 10, 1949

2 Claims. (Cl. 192—3.5)

This invention relates to a multi-speed gear system, more particularly for motorcycles.

It is the object of the present invention to provide a multi-speed gear system in which it is not possible to change the speed unless a predetermined revolution number of the gear has been reached which is appropriate for putting in the desired speed.

With this object in view, the multi-speed gear system according to the present invention is provided with a centrifugal gear control mechanism and an unlocking mechanism for a device locking the gear change, which unlocking mechanism can be operated by the clutch rod, in such a way that the next higher or lower speed can be put in by the clutch rod only when the revolution number set for putting in the desired speed has been reached, since only in this case the required shifting motion can be carried out under action of the centrifugal gear control mechanism.

Other and further objects, features and advantages of the invention will be pointed out hereinafter and appear in the appended claims forming part of the application.

In the accompanying drawings a now preferred embodiment of the invention is shown by way of illustration and not by way of limitation.

In the drawings:

Fig. 1 is an axial section through the multi-speed gear system,

Fig. 2 is a fragmentary section showing a detail of the gear, and

Fig. 3 is a fragmentary section on the line I—I of Fig. 1.

Similar reference numerals denote similar parts in the different views.

Referring now to the drawing in greater detail, it will be seen that this embodiment of the invention relates to a four-speed gear, more particularly for motor-cycles, which is provided with a semi-automatic change-speed mechanism. The gear casing comprises a casing half 1 in which the four-speed gear is accommodated, and a casing half 2 in which the centrifugal change-speed mechanism is housed. 3 is the driving shaft and 4 is the driven shaft of the four-speed gear. The driving shaft 3 is mouted for rotation in the front end wall 1' of the casing part 1, in a bearing 6 provided with a bushing 5, by means of roller bearings 7. Fixedly seated on the extreme end of said shaft is the clutch plate 8 which is driven by a friction disc 9 of a driving chain wheel 10 resiliently pressed against said plate, said chain wheel 10 being mounted on the hub of the clutch plate 8 by means of ball bearings 11. Mounted in the bearing hub of the clutch plate 8 by means of a roller bearing 12, and in the hollow driving shaft 3 by means of a roller bearing 13 and 14, is one end of the hollow driven shaft 4. The opposite end of said driven shaft is mounted for rotation in a roller bearing 15 in the front side wall 2'. An auxiliary shaft 19 is mounted for rotation in the front side casing wall 1' and in the opposite partition wall 16, by means of roller bearings 17 and 18, and an auxiliary shaft 22 is mounted for rotation in roller bearings 20 and 21, said auxiliary shafts lying parallel to the driven shaft 4. The auxiliary shaft 19 is provided with two gear wheels or toothed rims 23 and 24 and the auxiliary shaft 22 bears a hub 25 keyed thereon and provided with two toothed rims 26 and 27. The driving shaft 3 is provided with a toothed rim 28 which on the one hand meshes with a toothed wheel 29 keyed on the auxiliary shaft 19 and on the other hand, through two intermediate toothed wheels 30, 31, drives a toothed wheel 32 keyed on the auxiliary shaft 22. Mounted on the driven shaft 4 for axial shifting is a change-speed or gear-shifting cylinder 33, being secured against rotation by a key 34 and bearing two toothed rims 35 and 36. The toothed rim 35 is adapted to be engaged with the toothed rim 23 or with the toothed rim 26, by axial displacement of the gear-cylinder 33, while the toothed rim 36 is adapted to be engaged with the toothed rims 24 or 27. In Fig. 1, the gear-shift cylinder 33 is set to the first speed, by engagement of the toothed rim 35 with the toothed rim 23. The second speed is established by the meshing of the toothed rim 35 with the toothed rim 26. By engagement of the toothed rim 36 with the toothed rim 24 the third speed is formed, and by engagement of the toothed rim 36 with the toothed rim 27 the fourth speed is set. The axial shifting of the shifting cylinder 33 required for said speed changes is effected by means of a change-speed mechanism 37 operating by centrifugal force, after the manner of a centrifugal governor, whose weights 37' tend to spread in case of increasing revolution number of the gear, thereby exerting an axial shifting force, opposed to the pressure of a compression spring 38 upon the shifting cylinder 33. To this end, the arms of the weights 37' are hinged or pivoted on the one hand to bearing lugs 39 of the shifting cylinder 33 and on the other hand to bearing lugs 40 of a sleeve 41 secured on the shaft 4. The compression spring 38 acts between the sleeve 41 and the shifting cylinder 33. Slidably mounted in the axial bore of the driven shaft 4 is a coupling rod 42 which is adapted to be operated by a clutch lever 43. The clutch rod 42 acts, through a balance 44, upon a releasing or unlocking disc 45 which is connected through a connecting bolt 46 with the friction disc 9. The chain wheel 10 which is under action of the frictional pressure of the clutch is supported by a ball bearing 47 against an abutment ring 48 which is secured on the bearing hub of the clutch disc 8. In order to arrest the shifting cylinder in its four shifting positions for the four different speeds, the interior surface of the shifting cylinder is provided with turned in grooves or dwells 49—53 adapted to be successively engaged with a locking bolt 54 mounted in a radial bore of the shaft 4 and adapted to be arrested in its engaged position by the clutch rod 42, which in turn is provided with an annular groove 55 serving for unlocking the locking bolt. To this end the clutch rod has to be shifted by such an amount that its annular groove 55 registers with the locking bolt and the latter can recede into the annular groove 55. In the idle run or no-load position of the gear system the toothed rim 35 of the shifting cylinder is disposed between the toothed rim 23 and the toothed wheel 29. A control of shift lever 56 mounted in a slot 57 in bearing lugs 58 of the casing 1 for operation from outside serves for shifting the shifting cylinder 33 from idle run to the first speed, by acting upon the toothed rim 35, as shown by the fragmentary section of Fig. 2. The operation of the mechanism is as follows:

By operation of the lever 56 and simultaneous short pressure upon the control lever 43, the shifting cylinder can be moved into the position as per Fig. 1, whereby the starting or first speed of the gear is engaged. When the shaft 4 has reached a speed of e. g. 300 R. P. M., which may be the maximum number of revolutions for the first speed, the centrifugal force exerted upon the shifting cylinder by the gear change mechanism may be just large enough to draw the shifting cylinder 33 into registry of its toothed rim 35 with the toothed rim 26. Now, by a short forcible operation of the control lever 43 the locking bolt 54 can be unlocked, so that the second speed is thrown in under action of the centrifugal gear-change mechanism. Since during the shifting motion of the change-speed mechanism the clutch lever already had been relieved again, the locking bolt 54 is forced back into the dwell or groove 51 defining the second speed, by spring action of the releasing disc 45 the clutch rod 42, and locked by shifting the clutch rod. In the same manner the third speed can be put in after having reached a revolution number of e. g. 600 R. P. M. which may be the maximum number of revolutions for the second speed, by a short and forcible operation of the clutch lever 43. When the shaft 4 exceeds the revolution number of about 900 R. P. M. in the third speed, the gear can be shifted to the fourth speed by a short and forcible operation of the clutch lever 43, whereby a maximum speed of more than 1,400 R. P. M. can be reached.

Shifting back to the third speed is only possible after the revolution number has been reduced to less than 900 R. P. M., i. e., again by a short and forcible operation of the clutch lever 43. In the same manner it is possible to shift back to the second and starting or first speeds after the revolution number has been decreased below 600 or 300 R. P. M., respectively. In the no-load position of the gear the shifting cylinder 33 is locked by engagement of the locking bolt 54 in the dwell or groove 49.

While the invention has been described in detail with respect to certain now preferred examples and embodiments of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. In a multi-speed gear system in combination, a driving shaft; clutch means for operatively connecting said driving shaft to an engine; a hollow driven shaft; shiftable gear means operatively connecting said driving shaft and said driven shaft including a shifting cylinder mounted axially slidably on said driven shaft and having a plurality of interior recesses each corresponding to an engaged position of said gear means, and change wheels mounted on said shifting cylinders; a spring type shifting means urging said shifting cylinder into lower speed positions; centrifugal shifting means urging said shifting cylinder into higher speed positions against the action of said spring type shifting means as the rotative speed of said driven shaft increases; a locking bolt mounted in a radial bore of said driven shaft for cooperation with said recesses, so as to lock said shifting cylinder in various positions, in which one of said change wheels is engaged; and manually operated rod means extending through and axially displaceable in the center bore of said driven shaft and having a recess for temporarily receiving said locking bolt in unlocking position so as to permit the automatic shifting of said shifting cylinder by the combined action of said spring type shifting means and said centrifugal shifting means into the position corresponding to the rotative speed of said driven shaft, while said clutch means are simultaneously released by the unlocking motion of said rod means.

2. In a multi-speed gear system in combination, a driving shaft; clutch means for operatively connecting said driving shaft to an engine; a hollow driven shaft; shiftable gear means operatively connecting said driving shaft and said driven shaft including a shifting cylinder mounted axially slidably on said driven shaft and having a plurality of interior annular grooves each corresponding to an engaged position of said gear means and change wheels mounted on said shifting cylinder; a spring type shifting means urging said shifting cylinder into lower speed positions; centrifugal shifting means urging said shifting cylinder into higher speed positions against the action of said spring type shifting means as the rotative speed of said driven shaft increases; a locking bolt mounted in a radial bore of said driven shaft for cooperation with said annular grooves, so as to lock said shifting cylinder in various positions, in which one of said change wheels is engaged; and manually operated rod means extending through and axially displaceable in the center bore of said driven shaft and having an annular groove for temporarily receiving said locking bolt in unlocking position so as to permit the automatic shifting of said shifting cylinder by the combined action of said spring type shifting means and said centrifugal shifting means into the position corresponding to the rotative speed of said driven shaft while said clutch means are simultaneously released by the unlocking motion of said rod means.

SIEGRIST WALTER.

REFERENCES CITED

The following references are of record in the file of this patent:

UNITED STATES PATENTS

| Number | Name | Date |
|---|---|---|
| 907,711 | Anthony | Dec. 29, 1908 |
| 1,099,520 | Spacke et al. | June 9, 1914 |
| 1,277,299 | Duncan | Aug. 27, 1918 |
| 1,446,806 | Mathis | Feb. 27, 1923 |
| 1,502,953 | Hoffman | July 29, 1924 |
| 1,702,065 | Treece | Feb. 12, 1929 |
| 1,725,151 | Lock | Aug. 20, 1929 |
| 1,769,193 | Stone | July 1, 1930 |
| 1,800,141 | Harding | Apr. 7, 1931 |
| 2,105,742 | Lee | Jan. 18, 1938 |
| 2,238,208 | Anthony | Apr. 15, 1941 |